Dec. 19 1922.
C. Z. SHALLIT.
Egg Grader.
Filed May 1. 1922
1,439,133
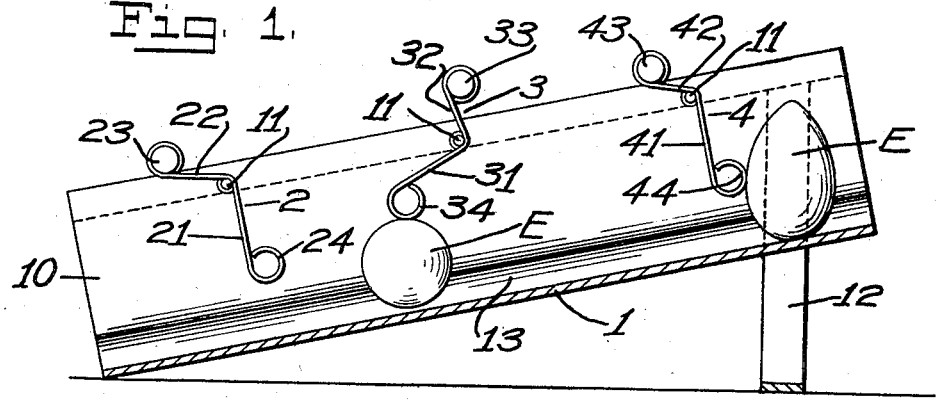
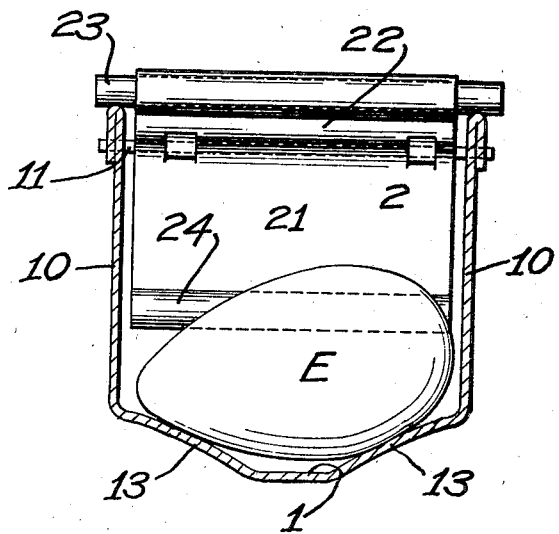
Inventor
Charles Z. Shallit
By W. L. & C. L. Reynolds
Attorneys Patented Dec. 19, 1922.

1,439,133

UNITED STATES PATENT OFFICE.

CHARLES Z. SHALLIT, OF SEATTLE, WASHINGTON.

EGG GRADER.

Application filed May 1, 1922. Serial No. 557,761.

*To all whom it may concern:*

Be it known that I, CHARLES Z. SHALLIT, a citizen of the United States of America, and resident of the city of Seattle, in the county of King and State of Washington, have invented certain new and useful Improvements in Egg Graders, of which the following is a specification.

My invention is intended to grade eggs, fruit, and like objects by gravity, and it is my principal object to produce such an egg grader which shall be simple, inexpensive, and which will permit the rapid and easy grading of eggs according to weight.

Objects relating to structural details may be ascertained from a study of the accompanying drawings and of the following specification and claims.

My invention comprises those novel parts and combinations thereof which are shown in the accompanying drawings, described in the specification, and particularly defined by the claims terminating the same.

In the accompanying drawings I have shown my invention in the form which is now preferred by me.

Figure 1 is an elevation of the egg grader with the near side removed.

Figure 2 is a transverse section through the grader.

Essentially my device consists of an incline 1 and a plurality of stops arranged in order down the incline, these being shown as the gates 2, 3 and 4. These stops or gates are yieldingly held in the path of eggs which are rolled down the incline 1 and progressively down the incline are arranged to resist the passage of the eggs with increasing force.

The incline 1 is shown herein as forming the bottom of a trough having sides 10 which enclose the eggs E and which serve as supports for the gates 2, 3 and 4. The gates are shown as horizontally pivoted upon pins 11, although some other pivot arrangement might be employed if desired. The gates themselves are bent to form what is, in effect, a bell crank lever pivoted upon the pin 11. These may conveniently be made of sheet metal as shown herein, the bell crank levers being composed of the downwardly extending arms 21, 31 or 41, as the case may be, and laterally extending arms 22, 32 or 42, respectively. Means are provided for correctly positioning the gates in the path of the eggs E, as they move down the incline, these means being shown as bars 23, 33 or 43 which are secured in a loop at the end of the laterally extending arms 22, 32 and 42, respectively, which bars extend across the egg chute and rest normally upon the upper edges of the sides 10.

Various expedients might be employed for varying the leverage of the laterally extending arms of these gates, to increase or decrease their downward torque about the pins 11. However, I prefer that the arms 42, 32 and 22 be increased in length in the order named, the bars 43, 33 and 23 remaining of equal weight. With such an arrangement the downwardly extending arms 41, 31 and 21 should be equal and are so shown.

In order to prevent an egg which rolls end over end from striking higher up on one of the arms than another which rolls upon its side, and thus, by changing the leverage for this gate, indicating a falsely light weight, I provide a curled end 44, 34, and 24 on the respective gates, this extending toward the upper end of the incline in position to be contacted with by an egg. Thus the point of contact of any egg E with any gate will be at substantially the same distance from the pivot pin 11, whether the egg is rolling on its side as is the lower egg in Figure 1 or rolling end over end as is the upper egg. Obviously any suitable forward extension might be employed instead of the curled end 44.

Eggs are started down the incline from the upper end and strike first the gate 4. If they are heavier than what is known as the "peewee" size they will be sufficiently heavy to raise the gate 4 against the resistance of the weight 43 acting on the lever arm 42, and the egg will pass on. The gate will drop again into its normal position, due to the influence of gravity upon the weight 43. The gate 3 will similarly operate for eggs of weight greater than those known as "pullet" size. The gate 2 will offer still greater resistance, and should be designed to stop eggs of standard size and to permit only over-size eggs to pass. The eggs are thus automatically and accurately graded according to their weight by the mere operation of rolling them down an incline.

Naturally the inclination of the incline 1 will have an effect upon the force exerted by a given egg upon the downwardly extending arm of any gate. I have therefore shown a support 12 which is fixed to the upper end of the incline and of a given height so that when the grader is placed upon a level surface eggs of the proper size will be stopped by the respective gates. I have also shown the bottom of the incline as depressed, with its edges 13 upraised to form two curved surfaces upon which the egg may roll when rolling on its side. This maintains the egg rolling on its side in proper position to contact with the forward extensions 44, 34 or 24, while the central trough permits an end-over-end egg to drop somewhat lower, whereby its point will not strike above these extensions.

What I claim as my invention is:

1. An egg grader comprising an incline and a plurality of yieldingly held stops of varying resistances positioned in the path of an egg rolling down said incline.

2. An egg grader comprising an incline and a plurality of gravity-held gates of varying resistances pivoted thereabove in the path of an egg rolling down said incline.

3. An egg grader comprising an incline, upwardly-extending supports at each side thereof, and a plurality of spaced gates pivoted in and depending from said supports in the path of an egg rolling down said incline, said gates normally being yieldingly held in such position with progressively increasing force towards the lower end of the incline.

4. An egg grader comprising an incline and a plurality of yieldingly held stops of varying resistances positioned in the path of an egg rolling down said incline, each stop having a contact member projecting therefrom towards the upper end of the incline.

5. An egg grader comprising an incline, a plurality of bell-crank levers pivoted thereabove, one arm of each lever extending substantially horizontally, and the other arm substantially vertically in the path of an egg rolling down said incline, said horizontal arms having an increasing downward effect each different from the others, to vary the resistance of its vertical arm to passage of the egg.

6. An egg grader comprising an incline, a plurality of bell-crank levers horizontally pivoted thereabove, one arm of each lever normally extending substantially horizontally, and its other arm substantially vertically in the path of an egg rolling down said incline, stops for positioning said levers in normal position, said horizontal arms, in succession down the incline, being weighted and having an increased downward effect to progressively increase the resistance of its respective vertical arm against displacement by an egg.

7. An egg grader comprising an incline, a plurality of bell-crank levers horizontally pivoted thereabove, one arm of each lever normally extending laterally towards the lower end of the incline, and its other arm extending downwardly into the path of an egg rolling down the incline, said downwardly extending arms being of equal length, and the laterally extending arms being equally weighted and of different lengths, thereby to vary the resistance of said vertical arms against displacement.

8. An egg grader comprising an incline, a plurality of bell-crank levers horizontally pivoted thereabove, one arm of each lever normally extending laterally towards the lower end of the incline, and its other arm extending downwardly into the path of an egg rolling down the incline, said downwardly extending arms being of equal length, and the laterally extending arms being equally weighted and increasing in length towards the lower end of the incline, thereby to progressively increase the resistance of said vertical arms against displacement.

9. An egg grader comprising an incline, upwardly extending supports at each side thereof, a plurality of transverse gates spaced lengthwise of said incline and pivoted horizontally in said supports, said gates normally depending into the path of an egg rolling down said incline, each gate having an arm extending laterally beyond its pivot, towards the lower end of the incline, a weighted bar secured in each of said arms and normally resting upon said supports, the leverage of said weights and arms increasing towards the lower end of the incline, to progressively increase the resistance of said gates to an egg rolling down the incline.

10. An egg grader comprising an incline, a plurality of gates forming bell-crank levers horizontally pivoted thereabove, one arm of each lever normally extending laterally towards the lower end of the incline, and its other end extending downwardly into the path of an egg rolling down the incline, the lower ends of said levers or gates being rolled towards the upper end of the incline, and being of equal length, and the laterally extending arms being equally weighted, and progressively increasing in length towards the lower end of the incline.

11. An egg grader comprising an egg chute, gates pivoted in the sides of said chute and depending into the path of an egg passing therethrough, said gates being yieldingly held in position each with a force greater than that holding the next preceding gate in the direction of movement of the egg.

Signed at Seattle, King County, Washington, this 26th day of April, 1922.

CHARLES Z. SHALLIT.